United States Patent [19]

Coles

[11] Patent Number: 5,498,368
[45] Date of Patent: Mar. 12, 1996

[54] LIQUID CRYSTAL DEVICES

[75] Inventor: Harry J. Coles, Stockport, United Kingdom

[73] Assignee: Dow Corning Limited, Bary, United Kingdom

[21] Appl. No.: 302,289

[22] Filed: Sep. 8, 1994

[30] Foreign Application Priority Data

Sep. 10, 1993 [GB] United Kingdom ............... 9318776

[51] Int. Cl.$^6$ .............................. C09K 19/20; G02F 1/13
[52] U.S. Cl. ............................. 252/294.67; 252/299.01; 359/103
[58] Field of Search ..................... 252/299.01, 299.67; 359/103

[56] References Cited

U.S. PATENT DOCUMENTS

| 4,358,391 | 11/1982 | Finkelmann | 252/299.01 |
| 4,981,607 | 1/1991 | Okawa | 252/299.01 |
| 5,106,530 | 4/1992 | Haas et al. | 252/299.6 |
| 5,138,010 | 8/1992 | Keller et al. | 252/299.01 |
| 5,259,987 | 11/1993 | McArdle et al. | 252/299.01 |
| 5,316,693 | 5/1994 | Yuasa et al. | 252/299.01 |

FOREIGN PATENT DOCUMENTS

| 029162 | 11/1980 | European Pat. Off. . |
| 0322703 | 12/1988 | European Pat. Off. . |
| 0478034 | 1/1992 | European Pat. Off. . |
| 1144491 | 6/1989 | Japan . |
| 1268785 | 10/1989 | Japan . |
| 2180890 | 7/1990 | Japan . |
| 2146787 | 4/1985 | United Kingdom . |
| 2274652 | 8/1994 | United Kingdom . |

OTHER PUBLICATIONS

Coles, H. et al; Liquid Crystals, vol. 15, No. 5, Nov., 1993 "New Low Molar Mass Organosiloxanes with Unusual Ferroelectric Properties", pp. 739–744.

"Ferroelectric and electrochiric characterization of a new organic siloxane bimesogen", Redmond et al. Ferroelectrics, vol. 148(1–4), 332–36, 1993 (abstract).

Primary Examiner—Shean Wu
Attorney, Agent, or Firm—James E. Bittel

[57] ABSTRACT

A liquid crystal device wherein the liquid crystal material is a siloxane-containing compound characterised by the the general formula

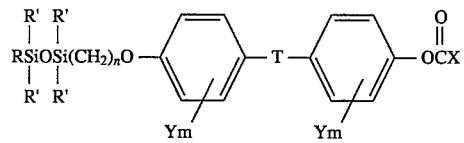

wherein R is a $C_{1-10}$ alkyl or

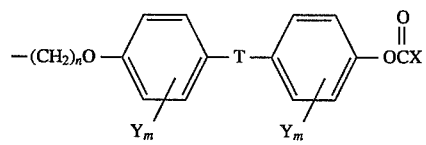

each R' is a $C_{1-4}$ alkyl, T is

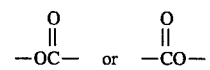

X is an alkyl or halogen-substituted alkyl group having at least one chiral center, Y is F, m is 0, 1 or 2 and n is 10, 11 or 12. Also claimed is a device wherein the liquid crystal material is disposed between a pair of substrates.

9 Claims, 1 Drawing Sheet

LIQUID CRYSTAL DEVICES

BACKGROUND OF THE INVENTION

1. Field of the Invention

This invention relates to devices containing liquid crystal oligomeric siloxane materials.

2. Background Information

Polymeric liquid crystals consisting of a siloxane backbone and a mesogenic portion are known, see for example E.P. 029 162 which discloses the preparation of such polymers by the addition of a polysiloxane having silicon-bonded hydrogen atoms to vinyl-substituted mesogenic molecules. More recently chiral smectic liquid crystal materials having ferroelectric properties have been described, see for example JP 01144491 which discloses materials containing

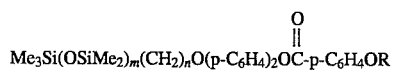

in which Me represents methyl, R represents an optically active alkyl or aralkyl group, m=0 to 5 and n=2 to 10.

Desirable properties of ferroelectric liquid crystals include a low viscosity and a relatively high tilt angle which is also substantially independent of temperature. Low viscosities are related to reduced response times and are advantageous when a dye is to be incorporated into the liquid crystal material. A high tilt angle is advantageous with regard to the electro-optic properties of the liquid crystal. In a device based on birefringence effects the tilt angle is normally 22.5° whereas devices incorporating dyes require an angle greater than this for good optical contrast. Measurements of the tilt angle of liquid crystal materials of the kind disclosed in JP 01144491 have shown not only a variation from polymer to polymer but also a reduction of the tilt angle with increasing temperature.

We have now surprisingly discovered that a certain narrowly defined group of oligomeric liquid crystal materials exist as neat compounds or in mixtures which exhibit relatively high tilt angles and that such angles are substantially independent of temperature over a broad temperature range including ambient.

SUMMARY OF THE INVENTION

Accordingly this invention provides a liquid crystal device wherein the liquid crystal material is a siloxane-containing compound having the general formula

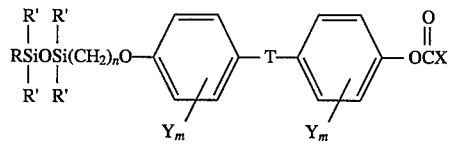

wherein R represents an alkyl group having from 1 to 10 carbon atoms or the group

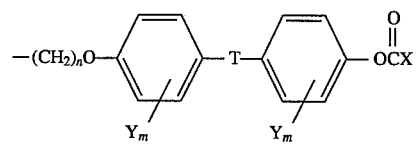

each R' represents an alkyl group having from 1 to 4 carbon atoms, T is

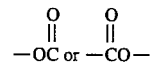

represents an alkyl or halogen-substituted alkyl group having at least one chiral centre, Y represents a fluorine atom, m has a value of 0, 1 or 2 and n has a value of 10, 11 or 12.

In the general formula of the liquid crystal material employed according to this invention R represents an alkyl group having from 1 to 10 carbon atoms, for example methyl, propyl, hexyl or decyl, and each R' may be methyl, ethyl, propyl or butyl. Preferably R' is methyl. The group X may be for example —CH(CH$_3$)—C$_2$H$_5$, —CHClCH(CH$_3$)C$_2$H$_5$ or —CHClCH(CH$_3$)CH$_3$. The preferred compounds are those wherein n has a value of 11. Such preferred compounds are believed to be novel and are included per se within the scope of this invention.

The liquid crystal materials employed according to the invention may be prepared by the addition of the appropriate unsaturated mesogen

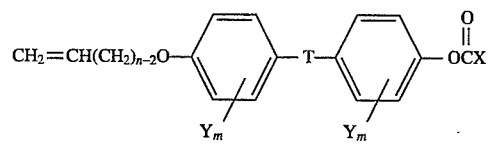

to the disiloxane RR'$_2$SiOSi(R')$_2$H. The addition may be performed employing conventional hydrosilylation techniques, for example in the presence of a platinum catalyst.

The device according to this invention may be of any type which relies on the use of a smectic or ferroelectric liquid crystal material for its operation. An example of such a device is illustrated in FIG. 1 of the accompanying drawings which is a schematic cross-sectional view.

BRIEF DESCRIPTION OF THE DRAWING

FIG. 2 Dependence of projected optical tilt angle on temperature ~36° C. for

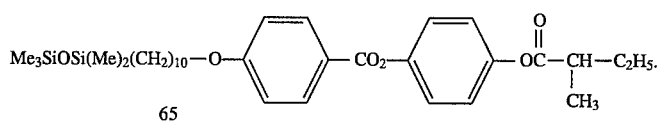

Figure 1:
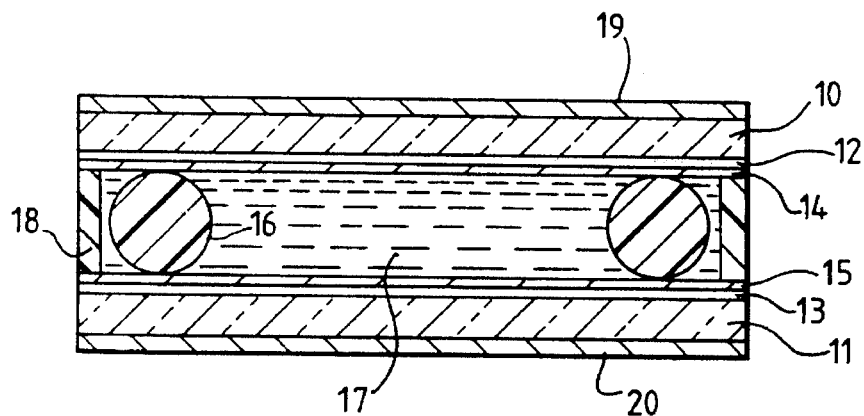
FIG. 1 is a schematic cross-sectional view of the invention.

The siloxane-containing crystal material (17) is interposed between a pair of substrates (10) which may be constructed of glass or a suitable polymer. The inner surfaces are coated with a transparent conducting film (12, 13) of indium tin-oxide and aligning agent (14, 15). Such surface aligning agents are known to those practiced in the art. Spacers (16) define the film thickness of between 1 and 100 μm and these may be polymeric films, photo-etched or glass fibre beads. The conducting film may cover the whole inner surface of the substrate or may be etched into a suitable pattern, for example a dot matrix or a seven segment display. Regions of the film may then be addressed by electrical fields to display information as required. These fields can be applied externally to the electrodes using suitable waveforms or internally using thin film transistor devices. Equally magnetic fields or thermal addressing using a suitably focused light source, including a laser, may be used to alter the appearance of the device. Appropriate optics and a beam steering system may be used to move the focus around to different regions of the film as to write information thereupon. Polarising films (19, 20) may be incorporated, if required, to observe the information.

Detailed Description of the Invention

The chiral smectic structure of the liquid crystal materials employed in this invention and non-racemic mixtures incorporating them exhibit ferroelectric properties. When these materials are included in a device of the type described by FIG. I fast electro-optic switching on the microsecond to millisecond time scales can be produced. In this phase the lamellar layers are aligned perpendicular to the substrate so that on application of an external field the molecules switch from one tilt angle at $+\Theta$ to that at $-\Theta$ as described in the literature. The initial field free planar alignment in which the molecules align on average parallel to the substrate is achieved using a polymer alignment layer. The polarisers are aligned crossed with each other but with one polariser polarisation direction aligned parallel to either $+\Theta$ or $-\Theta$. On application of the field the material switches to the opposite e state and the device transmits light due to the birefringent nature of the siloxane-containing liquid crystal materials. On removal of the electric field the alignment is retained.

Chiral or non-chiral pleochroic dyes may be incorporated into the liquid crystal material whereby only one polariser may be required. The dye aligns in the same direction as the liquid crystal molecules at + or $-\Theta$. Thus in one alignment state, say $+\Theta$, the dye absorbs the polariser light whilst in the other alignment state, say$-\Theta$, the absorption is highly reduced. Thus the dyed chiral smectic material may be used in colour switches.

In a further embodiment two dyed devices may be used in combination to give a colour switch that does not require external polarisers. Virtually any combination of colour may be achieved and the dyed devices act as switchable polarisers. The switched states are stable.

In yet a further embodiment the dye may be absorbing and fluorescent leading to a bright display utilising one or no polarisers. For the polarisation direction aligned parallel to the absorption direction, say at $+\Theta$, the fluorescence is bright whereas for the absorption direction non-parallel to the polarisation direction the absorption and hence the fluorescence is decreased. This gives an optical coloured switch that is fast, bright and in which the switched states are stable. The input polariser may equally be replaced by a switchable polariser of the type described above.

Close to the chiral smectic A to chiral smectic C phase transition the liquid crystal materials employed according to the invention have been seen to switch in a fashion known as electroclinic. In this mode a tilt angle is induced that is proportional to the applied field allowing its use in fast modulators or grey scale devices. This electroclinic switching is fast, depending on the field applied, but is not bistable. The effect may be enhanced using dichroic or fluorescent dyes.

The compound

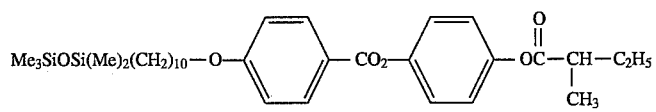

was prepared in its chiral (C*) form by the addition of pentamethyldisiloxane to 4-[(S)-2-methylbutanoyloxy]phenyl-4'-(9-decenyloxy)benzoate in the presence as catalyst of a complex formed between chloroplatinic acid and divinyltetramethyldisiloxane.

The electro-optic properties, tilt angle ($\Theta$), spontaneous polarisation (Ps) and response times (T) were measured in cells with 3μm spacers with rubbed polyimide alignment layers deposited on indium-tin oxide electrodes (5mm× 5mm). The cell was cooled at 1° C. per minute in the presence of 5 V μm$^{-1}$ AC field at 100 Hz to give good planar uniform alignment of the liquid crystal compound. The aligned cell showed good optical switching in the presence of reverse polarity pulsed DC fields.

Figure 2:
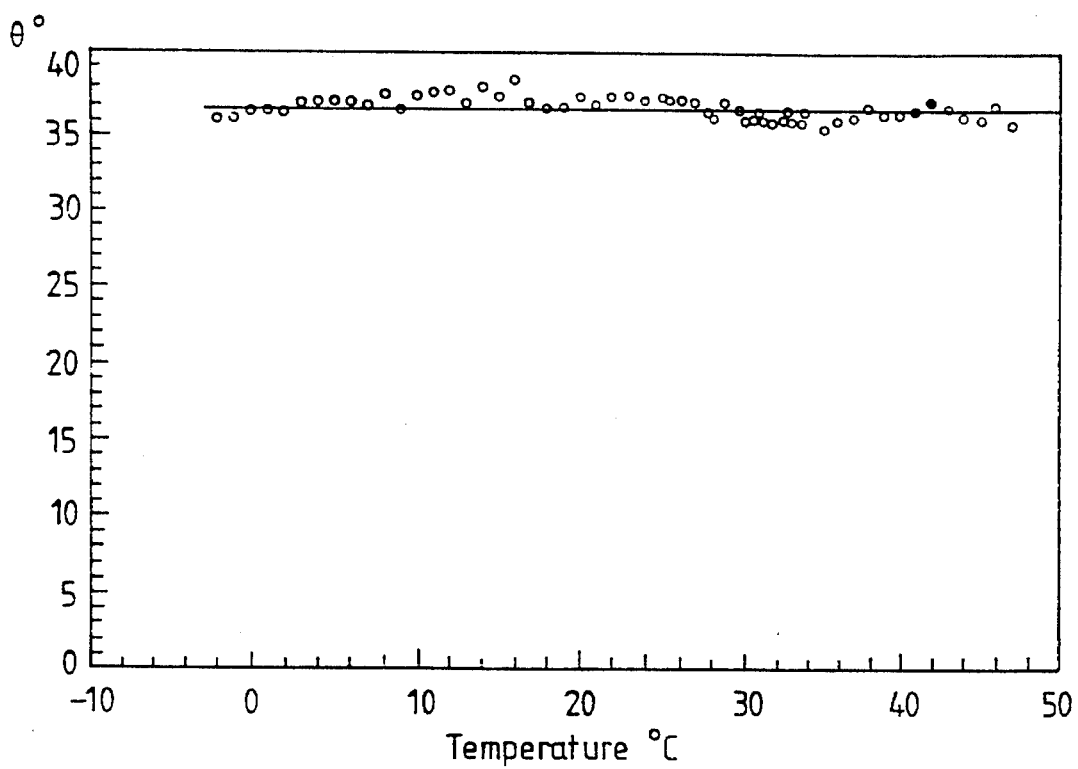

Tilt angles were measured as a function of temperature for an applied continuous square wave field of 10 V μm$^{-1}$ at 0.1 Hz and a probing wave length of 632.8 mm. The results are shown in FIG. 2 from which it can be seen that the tilt angle is virtually independent of temperature at a value of approximately 36° C.

The spontaneous polarisation was measured via the current pulse technique using an applied triangular wave with a peak field of 10 V μm$^{-1}$. The Ps value at 25° C. was 17 nCcm$^{-2}$.

At 20° C. the square wave response time to 10 V μm$^{-1}$ was approximately 210 μs.

That which is claimed is:

1. A liquid crystal device wherein the liquid crystal material is a siloxane-containing compound having the general formula

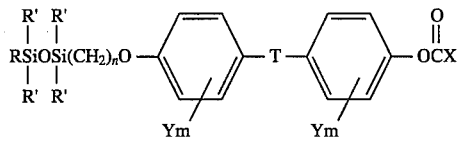

wherein R is selected from the group consisting of alkyl groups having from 1 to 10 carbon atoms and the group

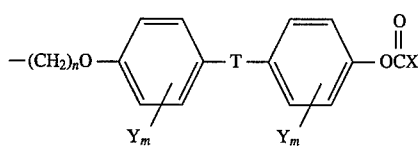

each R' represents an alkyl group having from 1 to 4 carbon atoms, T is selected from the group consisting of

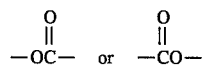

X is selected from the group consisting of alkyl groups having at least one chiral centre and halogen-substituted alkyl groups having at least one chiral centre, Y represents a fluorine atom, m has a value of 0, 1 or 2 and n has a value of 10, 11 or 12.

2. A device as claimed in claim 1 wherein each R' is methyl.

3. A device as claimed in claim 1 wherein R represents an alkyl group having from 1 to 6 carbon atoms.

4. A device as claimed in claim 2 wherein R represents an alkyl group having from 1 to 6 carbon atoms.

5. A device as claimed in claim 1 wherein n=11.

6. A device as claimed in claim 2 wherein n=11.

7. A device as claimed in claim 3 wherein n=11.

8. A device as claimed in claim 4 wherein n=11.

9. A device as claimed in claim 1 which comprises a pair of substrates having the liquid crystal material disposed between the substrates.

* * * * *